(12) United States Patent
VanderZee

(10) Patent No.: US 10,425,371 B2
(45) Date of Patent: Sep. 24, 2019

(54) METHOD FOR FRAGMENTED MESSAGING BETWEEN NETWORK DEVICES

(71) Applicant: TRANE INTERNATIONAL INC., Piscataway, NJ (US)

(72) Inventor: Joel C. VanderZee, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 413 days.

(21) Appl. No.: 14/216,463

(22) Filed: Mar. 17, 2014

(65) Prior Publication Data
US 2014/0280650 A1 Sep. 18, 2014

Related U.S. Application Data

(60) Provisional application No. 61/794,119, filed on Mar. 15, 2013.

(51) Int. Cl.
*H04L 12/58* (2006.01)

(52) U.S. Cl.
CPC .............. *H04L 51/24* (2013.01); *H04L 51/30* (2013.01)

(58) Field of Classification Search
CPC ................................. H04L 51/24; H04L 51/30
USPC ......................................................... 709/228
See application file for complete search history.

(56) References Cited

U.S. PATENT DOCUMENTS

| | | | | |
|---|---|---|---|---|
| 6,707,799 B1* | 3/2004 | Chui | ....................... | H04L 47/10 370/282 |
| 6,934,768 B1* | 8/2005 | Block | ..................... | H04L 69/16 709/228 |
| 7,068,606 B1* | 6/2006 | Ma | ..................... | H04L 12/5602 370/236 |
| 7,085,814 B1 | 8/2006 | Gandhi et al. | | |
| 7,280,524 B2* | 10/2007 | Muller | .................. | H04L 1/1854 370/236 |
| 7,304,975 B2* | 12/2007 | Shvodian | .............. | H04L 1/1858 370/312 |
| 7,441,019 B2 | 10/2008 | Zintel et al. | | |
| 7,602,756 B2 | 10/2009 | Gu et al. | | |
| 7,623,546 B1* | 11/2009 | Bashyam | ................ | H04L 47/10 370/465 |
| 7,986,701 B2 | 7/2011 | Kore et al. | | |
| 8,412,841 B1* | 4/2013 | Swaminathan | ..... | H04L 65/4084 709/203 |
| 8,559,313 B1* | 10/2013 | Mukerji | ................. | H04L 69/321 370/235 |
| 8,576,711 B1* | 11/2013 | Roskind | .................. | H04L 47/10 370/231 |
| 8,605,578 B1* | 12/2013 | Govindaraju | ......... | H04L 1/1838 370/229 |
| 2001/0017844 A1* | 8/2001 | Mangin | ................. | H04L 1/1671 370/231 |

(Continued)

*Primary Examiner* — Philip J Chea
*Assistant Examiner* — Wing Ma
(74) *Attorney, Agent, or Firm* — Hamre, Schumann, Mueller & Larson, P.C.

(57) ABSTRACT

Systems and methods for a network, wherein a network device sends one or more pieces of a fragmented message to another network device via a network, and the network device that has received the one or more pieces of the fragmented messaging sends one or more acknowledgments of the receipt of the one or more pieces of the fragmented message to the sender of the fragmented message.

14 Claims, 4 Drawing Sheets

(56) References Cited

U.S. PATENT DOCUMENTS

| | | | | |
|---|---|---|---|---|
| 2001/0036185 | A1* | 11/2001 | Dempo | H04L 29/06 370/392 |
| 2002/0016851 | A1* | 2/2002 | Border | H04B 7/18582 709/234 |
| 2002/0024944 | A1* | 2/2002 | Zhang | H04L 1/1628 370/349 |
| 2002/0091852 | A1* | 7/2002 | Frazier | H04L 47/266 709/232 |
| 2003/0135640 | A1* | 7/2003 | Ho | H04L 1/1621 709/237 |
| 2003/0214930 | A1* | 11/2003 | Fischer | H04L 1/1614 370/338 |
| 2004/0003106 | A1* | 1/2004 | Cunningham | H04L 1/1835 709/234 |
| 2004/0030790 | A1* | 2/2004 | Le | H04L 1/1858 709/230 |
| 2004/0120273 | A1* | 6/2004 | Border | H04B 7/18584 370/310 |
| 2005/0074007 | A1* | 4/2005 | Samuels | H04L 1/1887 370/392 |
| 2005/0265235 | A1* | 12/2005 | Accapadi | H04L 1/1803 370/235 |
| 2005/0267935 | A1 | 12/2005 | Gandhi et al. | |
| 2006/0034174 | A1* | 2/2006 | Nishibayashi | H04L 1/1614 370/235 |
| 2006/0034247 | A1* | 2/2006 | Gu | H04L 1/1628 370/349 |
| 2006/0045130 | A1* | 3/2006 | Kim | H04L 1/16 370/469 |
| 2006/0048034 | A1* | 3/2006 | Cho | H04L 1/1614 714/749 |
| 2006/0095518 | A1 | 5/2006 | Davis et al. | |
| 2006/0107166 | A1* | 5/2006 | Nanda | H04B 7/0417 714/748 |
| 2006/0164982 | A1* | 7/2006 | Arora | H04L 1/1664 370/229 |
| 2006/0168176 | A1* | 7/2006 | Arora | H04L 29/06 709/223 |
| 2006/0251028 | A1* | 11/2006 | Nagata | H04L 1/0083 370/338 |
| 2007/0008884 | A1* | 1/2007 | Tang | H04L 29/06 370/230 |
| 2007/0025250 | A1* | 2/2007 | Shimonishi | H04L 69/16 370/231 |
| 2007/0115963 | A1* | 5/2007 | Vadlakonda | H04L 29/06027 370/389 |
| 2007/0133566 | A1* | 6/2007 | Copps | H04L 1/1887 370/395.52 |
| 2007/0263708 | A1* | 11/2007 | Muller | H04L 1/1854 375/221 |
| 2007/0286077 | A1* | 12/2007 | Wu | H04L 1/1835 370/235 |
| 2008/0040498 | A1* | 2/2008 | Setlur | H04N 21/631 709/231 |
| 2008/0127342 | A1* | 5/2008 | Roesch | H04L 63/1408 726/23 |
| 2008/0170511 | A1 | 7/2008 | Shorty et al. | |
| 2008/0279159 | A1* | 11/2008 | Kumar | H04N 21/2662 370/338 |
| 2009/0006710 | A1* | 1/2009 | Daniel | G06F 9/45558 710/315 |
| 2009/0067325 | A1* | 3/2009 | Baratakke | H04L 69/16 370/229 |
| 2009/0216910 | A1 | 8/2009 | Duchesneau | |
| 2009/0312853 | A1* | 12/2009 | Kore | G05B 19/4185 700/90 |
| 2010/0005178 | A1* | 1/2010 | Sindelaru | H04L 47/10 709/228 |
| 2010/0020689 | A1* | 1/2010 | Tang | H04L 47/10 370/235 |
| 2010/0241275 | A1* | 9/2010 | Crawford | G05D 23/1917 700/276 |
| 2010/0303074 | A1* | 12/2010 | Lioy | H04W 28/06 370/392 |
| 2010/0332678 | A1* | 12/2010 | Accapadi | H04L 47/365 709/235 |
| 2011/0032935 | A1* | 2/2011 | Yang | H04L 47/10 370/389 |
| 2011/0302320 | A1* | 12/2011 | Dunstan | G06F 17/30017 709/235 |
| 2012/0033682 | A1* | 2/2012 | Corral | H04L 5/0042 370/476 |
| 2012/0198090 | A1* | 8/2012 | Saito | H04L 49/90 709/236 |
| 2013/0148671 | A1* | 6/2013 | Dipasquale | H04L 12/6418 370/474 |
| 2013/0176896 | A1* | 7/2013 | Shukla | H04L 12/462 370/254 |
| 2013/0306276 | A1 | 11/2013 | Duchesneau | |
| 2014/0023085 | A1* | 1/2014 | Aliseychik | H04L 49/90 370/412 |
| 2014/0056223 | A1* | 2/2014 | Quan | H04W 28/18 370/328 |
| 2014/0089471 | A1* | 3/2014 | Pianese | H04W 80/06 709/219 |
| 2014/0169164 | A1* | 6/2014 | Oguchi | H04L 47/193 370/230 |

\* cited by examiner

METHOD FOR FRAGMENTED MESSAGING BETWEEN NETWORK DEVICES

FIELD

This disclosure generally relates to methods for sending and receiving pieces of a fragmented message and sending and receiving an acknowledgment of the receipt of the pieces of the fragmented message between network devices.

BACKGROUND

The Transmission Control Protocol (TCP) and Internet Protocol (IP) protocol uses a variable-size data window for acknowledgment messages in response to a received data. When a network connection between devices is established, the initial acknowledgement of the handshake and each subsequent acknowledgment sent by a receiver device contains an updated data window size. A sender device (e.g., one of the devices connected to the network) of the data can stream an unbound length of data, and the sender device may send up to the data window size announced by the receiver device (e.g., one of the devices connected to the network). Each acknowledgement confirms receipt of up to a point of the first missing fragment of the data, so that the sender device can continue to, or after some time, repeat the transmission of the data from that point.

In a mesh network, such as ZigBee, fragmentation is defined within the Application Support System (APS) with a preset fixed window size by number of packets. The acknowledgment for one window can selectively acknowledge receipt of each fragment, so that the sender device can repeat only the necessary packets.

SUMMARY

The embodiments disclosed herein are directed towards a network device sending one or more pieces of a fragmented message to another network device via a network, and the network device that has received the one or more pieces of the fragmented messaging sending one or more acknowledgments of the receipt of the one or more pieces of the fragmented message.

A message maximum size is pre-determined and the message having a data size of less than the maximum size is sent as one or more fragments in a packet-based communication protocol (e.g., ZigBee). A sender device connected to the network may wait to receive an acknowledgement after sending the first data packet, or may repeat sending of the first data packet until the receiver device acknowledges receipt of the first data packet. The first data packet includes information about how many data packets there are in the fragmented message (e.g., how many packets complete the entire message). Accordingly, the receiver device "knows" how many data packets are needed based on the receipt of the first data packet. Based on this information, the receiver device can determine whether it has sufficient buffer size for the entire message. If there is insufficient buffer size for the entire message, the receiver device can send a fail message (i.e., negative acknowledgment) to the sender device based on the receipt of the first data packet. Accordingly, the sender device does not send the remaining data packets upon receipt of the fail message from the receiver device, advantageously not utilizing the network bandwidth with a futile exercise in sending data that would ultimately fail to be received in its entirety. If there is sufficient buffer size for the entire message, the receiver device can send an acknowledgment to the sender device communicating that the rest of the data packets should be sent (i.e., the receiver device is pre-acknowledging the entire message). Based on this acknowledgment, the sender device can send the rest of the messages to the receiver device. After the sender device has sent the rest of the messages, the sender device can wait for an acknowledgment from the receiver device. Alternatively, the sender device can repeat the sending of the last data packet after the rest of the messages have been sent (just in case the last data packet failed to arrive at the receiver device). The receiver device can send another acknowledgment when the rest of the data packets (i.e., the entire message) and/or the last data packet is received, and then, if needed send an acknowledgment with information about which data packets are missing. The receiver device can send an acknowledgment or a fail message after an amount of time if no more data packets are received.

DETAILED DESCRIPTION

This disclosure is directed towards a method, wherein a network device sends one or more pieces of a fragmented message to another network device via a network, and the network device that has received the one or more pieces of the fragmented messaging sending one or more acknowledgments of the receipt of the one or more pieces of the fragmented message.

References are made to the accompanying drawings that form a part hereof, and in which is shown by way of illustration of the embodiments in which the methods and systems described herein may be practiced.

Figure 1:
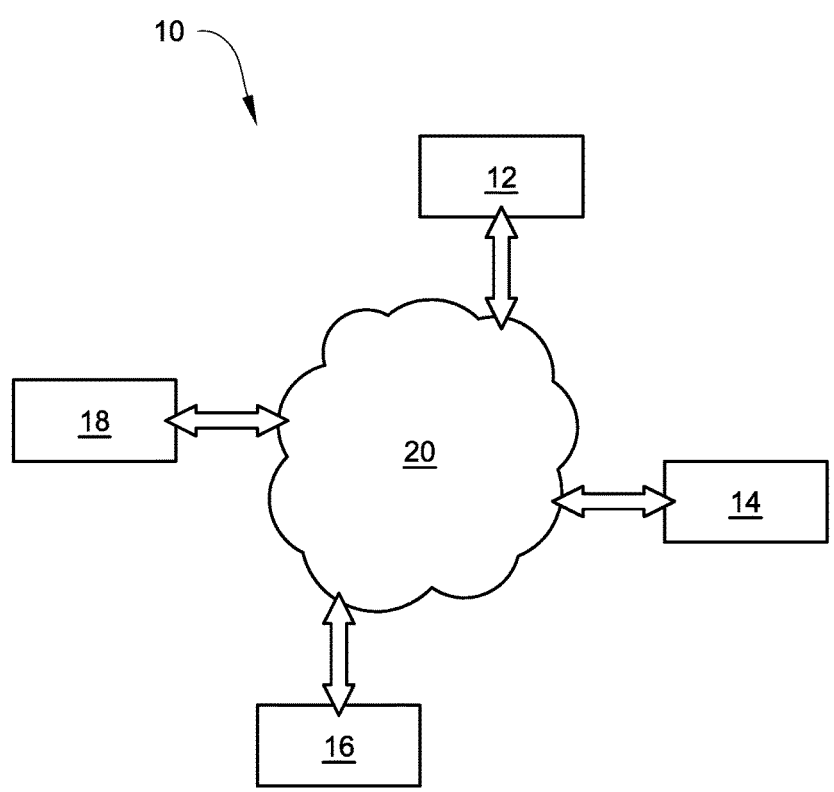
FIG. 1 illustrates a schematic diagram of a network according to an embodiment.

FIG. 1 illustrates a schematic diagram of a network system 10 according to an embodiment. The network system 10 includes one or more network devices 12, 14, 16, 18 connected to a network 20 so that the one or more network devices 12, 14, 16, 18 are in communication with each other via the network 20. Although FIG. 1 shows four network devices, it will be appreciated that any number of network devices (e.g., two network devices, fewer than four network devices, more than four network devices, etc.) can be included in the network system 10. Any one of the network devices 12, 14, 16, 18 can send data (e.g., fragmented message, acknowledgement, etc.) to any of the other network devices 12, 14, 16, 18 according to the embodiments of the method shown in FIGS. 2-5 and described in detail below.

For example, the network system 10 can include the network device 12 (e.g., a sender device) connected to the network 20 and another network device 14 (e.g., a receiver device) connected to the network 20. The sender device 12 includes a non-transitory memory, a processor, and a network interface, wherein the non-transitory memory includes computer-readable instructions for fragmenting a message into one or more data packets, wherein the first data packet includes information of a quantity of data packets, and the processor executes the computer readable instructions for transmitting via the network interface the first data packet to the receiver device 14. Further, the receiver device 14 includes a non-transitory memory, a processor, and a network interface, wherein the non-transitory memory includes computer-readable instructions for receiving the first data packet, and the processor executes the computer-readable readable instructions for determining whether the receiver device 14 can receive the quantity of data packets based on the information in the first data packet, and for sending a positive or negative acknowledgment via the network interface to the sender device 12.

In another embodiment of the network system 10, the computer-readable instructions stored in the non-transitory memory of the sender device 12 includes instructions for sending via the network interface the rest of the data packets to the receiver device 14 upon receiving a positive acknowledgment from the receiver device 14.

In another embodiment of the network system 10, the computer-readable instructions stored in the non-transitory memory of the sender device 12 includes instructions for sending via the network interface the rest of the data packets to the receiver device 14 upon receiving a positive acknowledgment, without the receiver device 14 sending an acknowledgment until the last of the data packets has been received by the receiver device 14.

In another embodiment of the network system 10, the computer-readable instructions stored in the non-transitory memory of the sender device 12 includes instructions for sending via the network interface the rest of the data packets to the receiver device 14 upon receiving a positive acknowledgment. Further, the computer-readable instructions stored in the non-transitory memory of the receiver device 14 includes instructions for sending via the network interface an acknowledgment of received data packets to the sender device 12.

In another embodiment of the network system 10, the computer-readable instructions stored in the non-transitory memory of the sender device 12 includes instructions for receiving via the network interface the acknowledgement of received data packets sent by the receiver device 14.

In some embodiments, each of the network devices 12, 14, 16, 18 includes components, such as, a network communication component, a processor, a non-transitory memory, and a power source for providing power for the operation of the components. Any of the embodiments of the methods described herein can be stored in the non-transitory memory as computer readable instructions (which can also be computer executable instructions for being executed by the processor). Accordingly, the computer readable instructions can be communicated to the processor, wherein the computer readable instructions are executed by the processor for carrying out the method.

In some embodiments, each of the network devices 12, 14, 16, 18 can be both a sender device and a receiver device. Accordingly, one or more of the network devices 12, 14, 16, 18 can include a non-transitory memory, a processor, and a network interface, wherein the non-transitory memory can include computer-readable instructions of both the sender devices and the receiver devices described herein.

In some embodiments, the network system 10 can be used in a Building Automation Control Network (e.g., BACnet) in communication with the network 20 which is a mesh network (e.g., ZigBee). In some embodiments, a portion of the network 20 may be established through, for example, a wire. A portion of the network 20 can be established wirelessly via a wireless network. In some embodiments, the network 20 is a wireless network, which may be established via or include the mesh network. BACnet is a communication protocol for building automation and control systems of, for example, a HVAC system, lighting control, access control, a fire control system, etc. The BACnet provides a way for the network devices 12, 14, 16, 18 to exchange information. For example, in a HVAC system, one of the network devices 12, 14, 16, 18 may be a system controller (SC), wherein the SC can communicate with a plurality of unit controllers to retrieve information from the unit controllers (UCs). For example, the UCs may also be one or more of the network devices 12, 14, 16, 18. The SC can make control decisions based on the information retrieved from the UCs, and communicate the control decisions to the UCs. The UCs can be configured to control a variety of network devices 12, 14, 16, 18, such as air handler units, terminal equipment, and/or a rooftop unit. The UCs may also be configured to be able to communicate with an array of sensors to receive, for example, indoor air temperature, or outdoor air temperature.

A mesh network is a type of networking, usually wirelessly, having two or more nodes, where each node receives and transmits data, and also serves as a relay for other nodes. In embodiments wherein the network 20 is a mesh network, one or more of the network devices 12, 14, 16, 18 can be the nodes. In the mesh network, the nodes collaborate to propagate the data in the network. ZigBee is an example of the mesh network. ZigBee is a specification for communication protocols using small, low-power digital radio devices based on an IEEE 802 standard for personal area networks (PAN).

An example of the low-power digital radio devices includes a Wireless Communication Interface (WCI). In some embodiments, when the WCI is connected to a SC, the WCI may function as a coordinator WCI of a wireless (e.g., ZigBee) network. In some embodiments, when the WCI is connected to a UC, the WCI may function as a router WCI of the wireless network. In some embodiments, when the WCI is not connected to another device, the WCI may function as a repeater WCI of the wireless network. In some embodiments, each of the WCIs may have an ID number that includes a group ID number and a net ID number. In some embodiments, the router WCIs and/or the repeater WCIs can be configured to automatically join a coordinator WCI with the same group and net ID numbers wirelessly.

A conventional ZigBee APS fragmentation has a trade-off in choosing to use a small number of packets or a larger number of packets as a window size. When the data window size is short, then many acknowledgement packets must be sent by the receiver device of the fragmented pieces, which takes up bandwidth of the network (which reduces the network efficiency). On the other hand, when the data window size is long, then many data packets will be sent in the first window prior to the sender device detecting that there can be a problem of where the receiver device does not have sufficient buffer space to reassemble the message, or the network route is failing so that the receiver device is not receiving the data packets. The embodiments disclosed herein do not have the deficiencies of the conventional ZigBee APS fragmentation.

Figure 2:
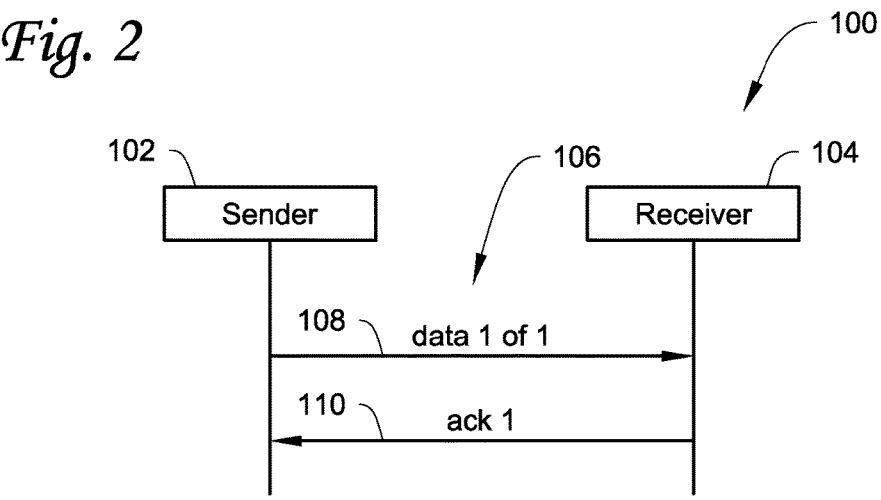
FIG. 2 illustrates an embodiment of a method for sending and receiving fragments and acknowledgements between a sender device and a receiver device via a network.

FIG. 2 illustrates an example of an embodiment of a method 100 for sending and receiving fragments and acknowledgements between a network device (a sender device) 102 and another network device (a receiver device) 104. The entire message 106 can fit in a single data packet (data 1 of 1) 108 sent by the sender device 102. After the receiver device 104 has received the single data packet 108, the receiver device 104 sends an acknowledgement 110 to the sender device 102. The sender device 102 receives the acknowledgement 110, and does not send another data packet 108.

Figure 3:
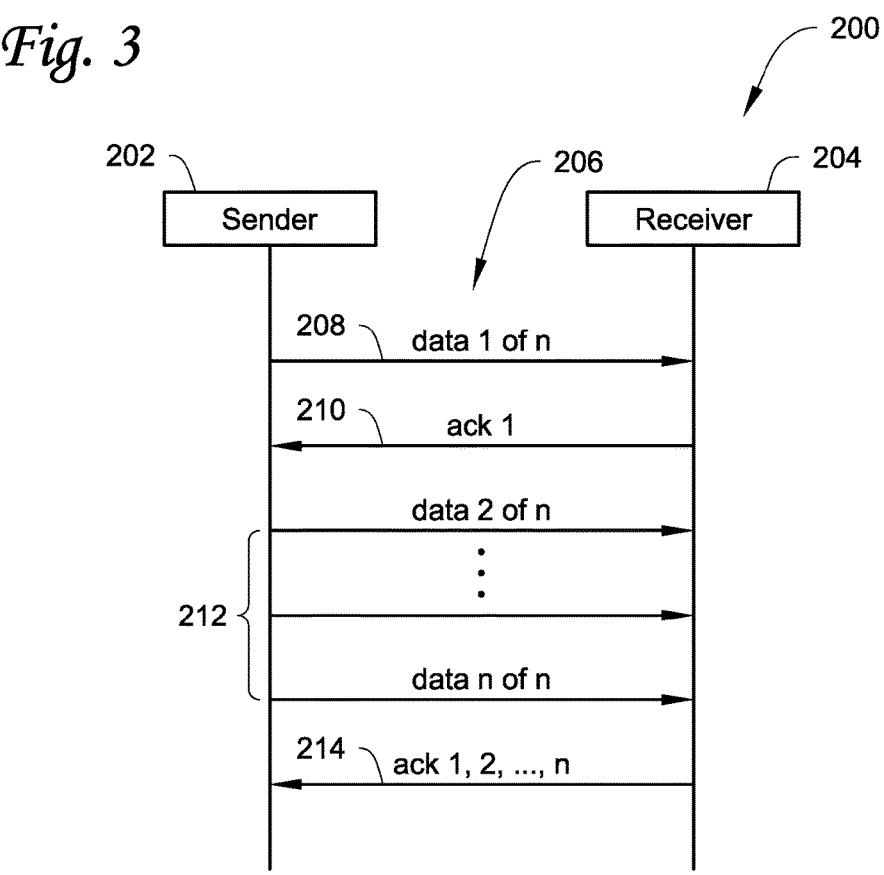
FIG. 3 illustrates an embodiment of a method for sending and receiving fragments and acknowledgements between a sender device and a receiver device via a network.

FIG. 3 illustrates an example of an embodiment of a method 200 for sending and receiving fragments and acknowledgements between a sender device 202 and a receiver device 204. The entire message 206 fits in n data packets (data n of n). The first data packet (data 1 of n) 208 is sent by the sender device 202, with the information of how many data packets complete the entire message (n). After the receiver device 204 has received the first data packet 208, the receiver device 204 can determine whether there is a reason to send a negative acknowledgement (e.g., insufficient buffer size for the entire message, device is busy, etc.). When the receiver device 204 has determined that the negative acknowledgment should not be sent (and/or that a positive acknowledgment should be sent), the receiver device 204 sends a first acknowledgement 210 to the sender device 202. The first acknowledgement 210 includes information that the rest of the n packets can be received (e.g., there is sufficient buffer space for the n packets at the receiver device 204). Then, the sender device 202 receives the acknowledgement 210, and sends the rest of the data packets (data 2 of n . . . data n of n) 212, without the receiver device 204 sending another acknowledgment (or negative acknowledgment) to the sender device 202 during the transmission of the rest of the data packets 212. After the data n of n has been received by the receiver device 204, the receiver device 204 determined whether all of the data packets have been received, as expected. If all of expected data packets have been received, then the receiver device 204 sends another acknowledgement 214 to the sender device 202 indicating that all of the data packets have been received (acknowledgement (or ack) 1, 2, . . . n).

Figure 4:
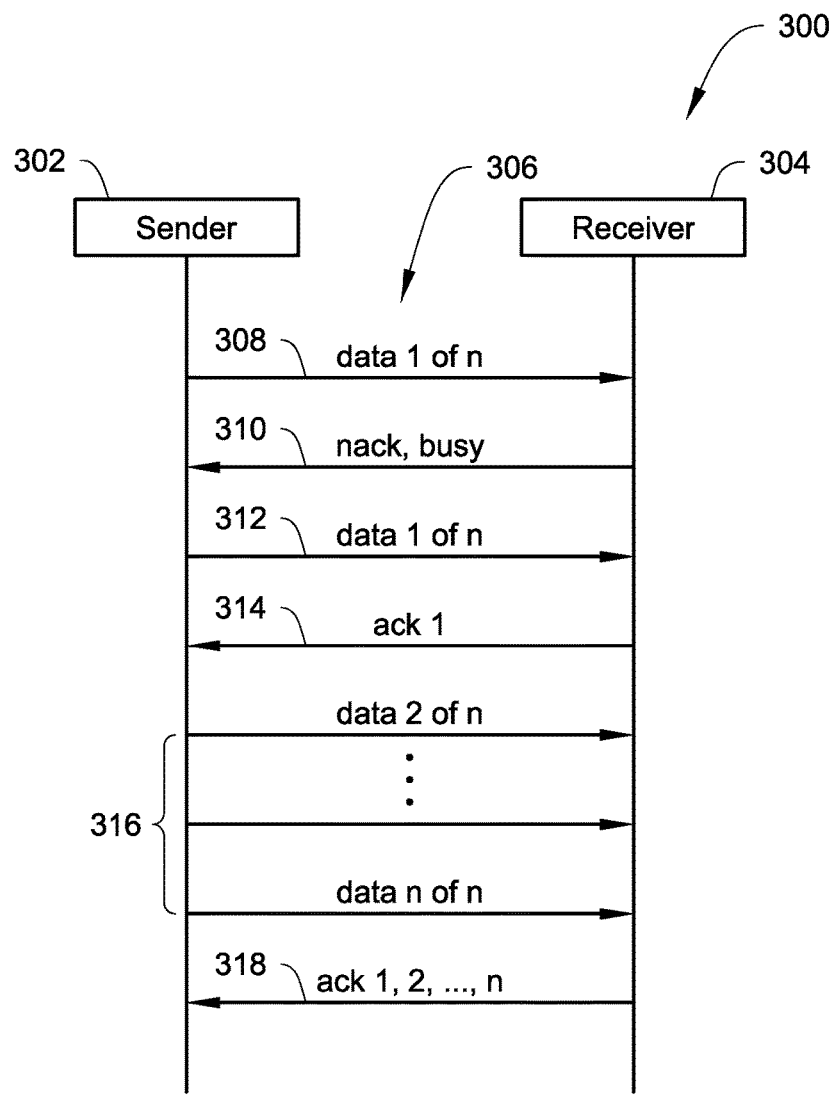
FIG. 4 illustrates an embodiment of a method for sending and receiving fragments and acknowledgements between a sender device and a receiver device via a network.

FIG. 4 illustrates an example of an embodiment of a method 300 for sending and receiving fragments and acknowledgements between a sender device 302 and a receiver device 304. The entire message 306 fits in n data packets (data n of n). A first transmission of the first data packet (data 1 of n) 308 is sent by the sender device 302, with the information of how many data packets complete the entire message (n). After the receiver device 304 has received the first transmission of the first data packet 308, the receiver device 304 determines whether there is a reason to send a negative acknowledgement (e.g., insufficient buffer size for the entire message, device is busy, etc.). In this example, the receiver device 304 has determined that the receiver device 304 is busy and cannot receive the message 306. Accordingly, the receiver device 304 sends a negative acknowledgment (nack) 310 to the sender device 302. The sender device 302, upon receipt of the negative acknowledgment 310, does not send the rest of the messages to the receiver device 304, for a time. After some time has passed, the sender device 302 tries again and sends a second transmission of the first data packet 312 to the receiver device 304. The second transmission of the first data packet 312 includes the information of how many data packets complete the entire message (n). After the receiver device 304 has received the first data packet 312, the receiver device 304 can determine whether there is a reason to send a negative acknowledgement (e.g., insufficient buffer size for the entire message, device is busy, etc.). When the receiver device 304 has determined that the negative acknowledgment should not be sent (and/or that a positive acknowledgment should be sent), the receiver device 304 sends an acknowledgement 314 to the sender device 302. The acknowledgment 314 includes information that the rest of the n packets can be received (e.g., there is sufficient buffer space for the n packets at the receiver device 304). Then, the sender device 302 receives the acknowledgement 314, and sends the rest of the data packets (data 2 of n . . . data n of n) 316 without the receiver device 304 sending another acknowledgment (or negative acknowledgment) to the sender device 302 during the transmission of the rest of the data packets 316. After the data n of n has been received by the receiver device 304, the receiver device 304 determined whether all of the data packets have been received, as expected. If all of expected data packets have been received, then the receiver device 304 sends another acknowledgement 318 to the sender device 302 indicating that all of the data packets have been received (ack 1, 2, . . . n).

Figure 5:
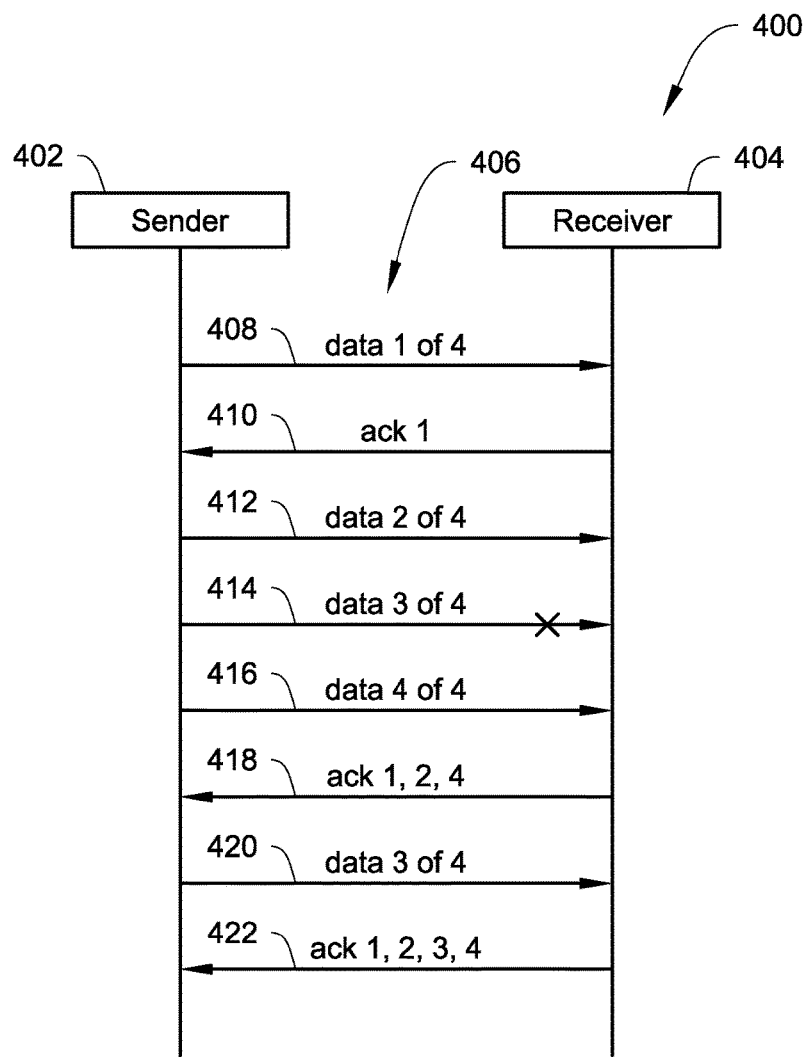
FIG. 5 illustrates an embodiment of a method for sending and receiving fragments and acknowledgements between a sender device and a receiver device via a network.

FIG. 5 illustrates an example of an embodiment of a method 400 for sending and receiving fragments and acknowledgements between a sender device 402 and a receiver device 404. The example shows that the entire message 406 can fit in 4 data packets (data 4 of 4). A transmission of the first data packet (data 1 of 4) 408 is sent by the sender device 402, with the information of how many data packets complete the entire message (4 packets). After the receiver device 404 has received the transmission of the first data packet 408, the receiver device 404 determines whether there is a reason to send a negative acknowledgement (e.g., insufficient buffer size for the entire message, device is busy, etc.). In this example, the receiver device 404 has determined that the receiver device 404 can receive the message 406. Thus, the receiver device 404 determines that a negative acknowledgment should not be sent (and/or that a positive acknowledgment should be sent). The receiver device 404 sends an acknowledgement 410 to the sender device 402. The acknowledgment 410 includes information that the rest of the 4 packets can be received (e.g., there is sufficient buffer space for the 4 packets at the receiver device 404). Then, the sender device 402 receives the acknowledgement 410, and sends the rest of the data packets, data 2 of 4 412, data 3 of 4 414, and data 4 of 4 416, without the receiver device 404 sending another acknowledgment (or negative acknowledgment) to the sender device 402 during the transmission of the rest of the data packets 412, 414, 416. After the data 4 of 4 416 has been received by the receiver device 404, the receiver device 404 determined whether all of the data packets have been received, as expected. In this example, the receiver device 404 has determined that data 3 of 4 414 was not received. The receiver device 404 sends another acknowledgement 418 to the sender device 402 indicating that the data packets 1, 2, and 4 have been received (ack 1, 2, 4) 418. The sender device 402, upon receipt of the acknowledgment 418, determines that data 3 of 4 must be sent again, and does so 420. The receiver device 404 receives the last remaining data packet (data 3 of 4) 420, and determines that the entire message has been received. Then, the receiver device 404 sends another acknowledgment 422 to the sender device 402 indicating that the entire message has been received (ack 1, 2, 3, 4).

In an example of a ZigBee network, an embodiment of the method can have a sender device that repeatedly transmits the first data packet up to 10 seconds until the sender device receives the first acknowledgement. The sender device can send the first data packet at intervals of 1.3 seconds as long as the MAC layer delivers the packet to the closest relay in the network. Otherwise, the sender device can send the first data packet at intervals of 150 ms a few times, request a new route discovery, and retry after 2 seconds. The sender device can use the same timing as for the first data packet to repeat the last data packet that the receiver device still needs. When the receiver device is waiting for more data packets after the receiver device sends an acknowledgment, the receiver device can repeat the acknowledgment twice at intervals of 600 ms as long as the MAC layer delivers the packet to the closest relay. Otherwise, the receiver device can send the acknowledgment a couple of times at intervals of 150 ms. The receiver device can discard received data if it waits 10.5 seconds without the arrival of data packets. If the receiver device does not have buffer space available, the receiver device can send a negative acknowledgment. Then the sender device can try sending the first data packet again twice at intervals of 20 ms, and then repeatedly at intervals of 1 second, for up to ten seconds or until the receiver device responds with an acknowledgment or some other type of negative acknowledgment. The times above are examples and it will be appreciated that other values could be used as desired based on delivery times of packets through the network.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A method for sending and receiving fragments and acknowledgements between a sender device and a receiver device connected in a mesh network, each of the sender device and the receiver device including a non-transitory memory, a processor, and a network interface, the method comprising:

the processor of the sender device fragmenting a message into a plurality of data packets, wherein the first data packet includes information of a quantity of the data packets;

the sender device transmitting the first data packet via the mesh network to the receiver device;

the receiver device receiving the first data packet via the mesh network;

the processor of the receiver device determining whether the receiver device can receive the rest of the data packets based on the information of the quantity of the data packets in the first data packet; and the receiver device sending a positive or negative acknowledgment via the mesh network to the sender device, wherein when the receiver device sends the positive acknowledgment, the receiver device sends only one more acknowledgment only after all of the data packets are received by the receiver device;

the sender device sending the rest of the data packets to the receiver device via the mesh network upon receiving the positive acknowledgment, without receiving another acknowledgment from the receiver device during the sending of the rest of the data packets; and the receiver device sending the only one more acknowledgment, which is another positive acknowledgment, via the mesh network only after the last of the data packets has been received by the receiver device, wherein the quantity of the data packets sent between the positive acknowledgment and the only one more acknowledgment is variable depending on the information of the quantity of the data packets, wherein the sender device transmitting the first data packet to the receiver device includes the sender device repeatedly transmitting the first data packet with intervals of at least 20 ms.

2. The method as in claim 1, further comprising:
the sender device receiving the acknowledgement of received data packets sent by the receiver device via the mesh network.

3. The method as in claim 2, further comprising:
the sender device resending one or more data packets that was/were not acknowledged by the receiver device via the mesh network.

4. The method as in claim 1, further comprising:
the sender device not sending the rest of the data packets upon receiving a negative acknowledgement from the receiver device.

5. A computer network, comprising:
a sender device connected to a mesh network, the sender device including a non-transitory memory, a processor, and a network interface; and
a receiver device connected to the mesh network,
wherein the sender device is configured for fragmenting a message into a plurality of data packets, wherein the first data packet includes information of a quantity of the data packets, and the processor executes the computer readable instructions for transmitting via the mesh network the first data packet to the receiver device,
the receiver device is configured for receiving the first data packet via the mesh network, and the processor executes the computer-readable instructions for determining whether the receiver device can receive the rest of the data packets based on the information of the quantity of the data packets in the first data packet, and for sending a positive or negative acknowledgment via the mesh network to the sender device,
the sender device is configured for sending via the mesh network the rest of the data packets to the receiver device upon receiving the positive acknowledgment from the receiver device, without receiving another acknowledgment from the receiver device during the sending of the rest of the data packets,
the receiver device is configured for sending only one more acknowledgment, which is another positive acknowledgment, via the mesh network only after the last of the data packets has been received by the receiver device, and
wherein the quantity of the data packets sent between the positive acknowledgment and the only one more acknowledgment is variable depending on the information of the quantity of the data packets,
wherein the sender device is also configured for transmitting the first data packet by repeatedly transmitting the first data packet with intervals of at least 20 ms.

6. The computer network as in claim 5, wherein the sender device is configured for receiving via the mesh network the acknowledgement of received data packets sent by the receiver device.

7. The computer network as in claim 6, wherein the sender device is configured for resending one or more data packets that was/were not acknowledged by the receiver device.

8. The computer network as in claim 5, wherein the sender device is configured for not sending the rest of the data packets upon receiving a negative acknowledgement from the receiver device.

9. The computer network as in claim 5, wherein the mesh network is a ZigBee network.

10. The method as in claim 1, wherein the mesh network is a ZigBee network, and the sender device transmitting the first data packet to the receiver device is via a ZigBee protocol.

11. The method as in claim 10, wherein the sender device transmitting the first data packet to the receiver device step includes the sender device repeatedly transmitting the first data packet for up to 10 seconds or until the sender device receives the positive or negative acknowledgement from the receiver device.

12. The method as in claim 11, wherein the intervals are up to 2 seconds.

13. The method as in claim 10, wherein the receiver device sending the positive or negative acknowledgement repeats the sending at intervals of from 150 ms to 600 ms.

14. A method for sending and receiving fragments and acknowledgements between a sender device and a receiver device connected in a mesh network, each of the sender device and the receiver device including a non-transitory memory, a processor, and a network interface, the method comprising:

the processor of the sender device fragmenting a message into a plurality of data packets, wherein the first data packet includes information of a quantity of the data packets;

the sender device transmitting the first data packet via the mesh network to the receiver device;

the receiver device receiving the first data packet via the mesh network;

the processor of the receiver device determining whether the receiver device can receive the rest of the data packets based on the information of the quantity of the data packets in the first data packet;

the receiver device sending a positive or negative acknowledgment via the mesh network to the sender device;

the sender device sending the rest of the data packets to the receiver device via the mesh network upon receiving the positive acknowledgment, without receiving another acknowledgment from the receiver device during the sending of the rest of the data packets; and the receiver device sending a second acknowledgment via the mesh network after the last of the data packets has been received by the receiver device, wherein the mesh network is a ZigBee network, and the sender device transmitting the first data packet to the receiver device is via a ZigBee protocol, the sender device transmitting the first data packet to the receiver device step includes the sender device repeatedly transmitting the first data packet for up to 10 seconds or until the sender device receives the positive or negative acknowledgement from the receiver device, and the sender device repeatedly transmitting the first data packet has an intervals of from 20 ms to 2 seconds.

* * * * *